United States Patent
Nelger et al.

(10) Patent No.: US 7,383,561 B2
(45) Date of Patent: Jun. 3, 2008

(54) CONDITIONAL ACCESS SYSTEM

(75) Inventors: Rickard Nelger, Motala (SE); Ari Nieminen, Motala (SE)

(73) Assignee: Nokia Corporation, Espoo (FI)

( * ) Notice: Subject to any disclaimer, the term of this patent is extended or adjusted under 35 U.S.C. 154(b) by 1181 days.

(21) Appl. No.: 09/893,523

(22) Filed: Jun. 29, 2001

(65) Prior Publication Data
US 2003/0005435 A1    Jan. 2, 2003

(51) Int. Cl.
H04N 7/167    (2006.01)

(52) U.S. Cl. .................. 725/31; 725/25; 725/105

(58) Field of Classification Search .......... 725/31, 725/25, 27, 109–110, 114–118; 380/223, 380/226, 278, 210–211, 232
See application file for complete search history.

(56) References Cited

U.S. PATENT DOCUMENTS

| | | | |
|---|---|---|---|
| 5,029,207 A * | 7/1991 | Gammie | 380/228 |
| 6,157,719 A * | 12/2000 | Wasilewski et al. | 380/210 |
| 6,229,895 B1 * | 5/2001 | Son et al. | 380/200 |
| 6,611,654 B1 * | 8/2003 | Shteyn | 386/83 |
| 6,963,579 B2 * | 11/2005 | Suri | 370/420 |
| 2001/0042203 A1 * | 11/2001 | Watchfogel et al. | 713/161 |
| 2002/0036658 A1 * | 3/2002 | Carolan et al. | 345/764 |
| 2002/0146125 A1 * | 10/2002 | Eskicioglu et al. | 380/255 |

FOREIGN PATENT DOCUMENTS

| | | |
|---|---|---|
| WO | 9843426 | 10/1998 |
| WO | 9933076 | 7/1999 |

\* cited by examiner

*Primary Examiner*—Ngoc Vu
(74) *Attorney, Agent, or Firm*—Banner & Witcoff, Ltd.

(57) ABSTRACT

A conditional access system in which entitlement control messages (ECMs) containing the encryption keys used to encrypt a program transmission, are sent to a set-top box over a secure communications channel separate from the channel used for transmission of the encrypted program.

16 Claims, 5 Drawing Sheets

CONDITIONAL ACCESS SYSTEM

FIELD OF THE INVENTION

The present invention relates generally to the field of broadcast and reception, particularly but not exclusively to a conditional access system in a digital satellite television system. More particularly, aspects of the present invention relate to the transfer of entitlement control messages in a channel separate from the broadcast channel.

BACKGROUND

Conditional access systems are well known and widely used in conjunction with currently available pay television systems. At present, such systems are based on the transmission of programmes scrambled with control words which are received by subscribers having a set-top box and a smart card for each subscription package. The smart card for a subscription package from a particular service provider allows the scrambled programmes within the package to be descrambled and viewed. The broadcast stream further contains entitlement management messages and entitlement control messages, which are necessary for the smart card to descramble the broadcast. The terms scrambled and encrypted are used interchangeably in this application. WO 98/43426 discloses a digital satellite television system in which the entitlement management messages are transmissible to the set-top box via a modem based back channel, rather than via the broadcast channel. This is done to speed up viewer authorisation in viewing systems such as pay-per-view, since there is a certain time delay before the subscriber authorisation system (SAS) can include the proper entitlement management messages in the broadcast stream. However, the entitlement control messages which contain the control word in an encrypted format are sent via the broadcast channel. The control word is decrypted at the set-top box by means of a smart card.

SUMMARY OF THE INVENTION

According to the present invention, there is provided a conditional access system comprising a first transmitter for transmitting a scrambled broadcast stream and a second transmitter for transmitting a plurality of control messages separate from the broadcast stream, said control messages including information for descrambling the broadcast stream.

The control messages may be sufficient on their own to allow the broadcast stream to be descrambled.

By separating the broadcast and control message channels, the need for a smart card can be obviated, since the information for descrambling the broadcast stream can be incorporated in said control messages without being encrypted. While the control messages can then be encrypted for transmission over a secure link, for example over a virtual private network using a protocol such as the https secure sockets protocol, the unencrypted control words are recovered at the receiver side of the secure link, so that the decoder does not require a smart card for decryption. Advantageously, since the decoder is thereby provided with ready to use decryption keys, the decoder can be made to be independent of any specialised conditional access system.

Additional security can be provided by encrypting the information for descrambling the broadcast stream into the control messages, which gives rise to the need for a smart card, such as a virtual or software smart card, at the decoder.

According to the invention, there is further provided a conditional access system comprising a first receiver for receiving a scrambled broadcast stream and a second receiver for receiving a plurality of control messages separate from the broadcast stream, the control messages including information for descrambling the broadcast stream.

The invention further provides a decoder for use in a conditional access system for decrypting encrypted broadcast content, comprising a first input module for receiving said encrypted broadcast content from a first communications channel and a second input module for receiving a plurality of control messages from a second communications channel, said control messages containing descrambling information for decrypting said broadcast content.

According to the invention, there is also provided a method for use in a conditional access system, in which a scrambled broadcast stream is transmitted to a decoder, said decoder being operable to receive a plurality of control messages including information for descrambling the broadcast stream, the method comprising sending said control messages to said decoder separately from said broadcast stream.

The invention yet further provides a method for use in a conditional access system, in which a scrambled broadcast stream is transmitted to a first decoder and a second decoder, said first and second decoders being operable to receive a plurality of control messages including information for descrambling the broadcast stream, the method comprising receiving a request to transmit a plurality of control messages to said second decoder separately from the broadcast stream.

Roaming can thereby be facilitated. By denying a service to the first decoder while the control message stream is being sent to the second decoder, use of the service at the subscriber's home location can be prevented whilst roaming.

The first decoder does not need to have the ability to receive control messages separately and can be a conventional decoder.

According to the invention, there is additionally provided a conditional access system, comprising a first communications channel for carrying a broadcast stream, said stream being scrambled with a stream of control words and a second communications channel separate from the first channel for carrying a stream of entitlement control messages, said entitlement control messages incorporating information relating to the stream of control words for descrambling the broadcast stream.

The entitlement control messages can alone contain all of the information required to descramble the broadcast stream, so that there is no need for other messages, such as entitlement management messages, to be transmitted. Furthermore, in this case, a decoder for descrambling the broadcast stream does not require a smart card.

BRIEF DESCRIPTION OF THE DRAWINGS

Embodiments of the invention will now be described, by way of example, with reference to the accompanying drawings, in which.

DETAILED DESCRIPTION

Figure 1:
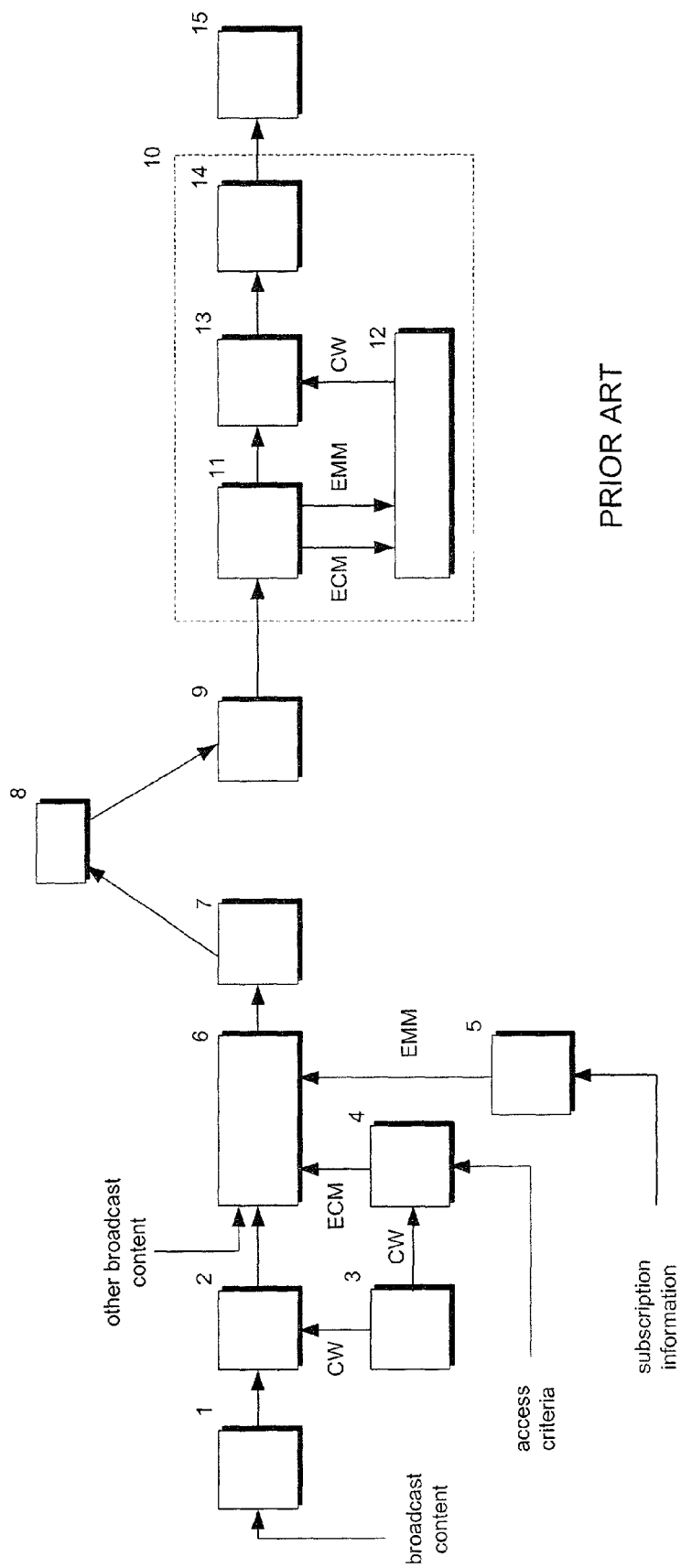
FIG. 1 is a schematic diagram of a conventional conditional access system.

Referring to FIG. 1, in a conventional conditional access system, content to be broadcast, including for example, video, audio and data components, is encoded in an encoder 1 using an appropriate coding system, for example MPEG-II for digital broadcasting. The encoded broadcast stream is encrypted or scrambled in a scrambler 2 under the control of a control word CW generated by a control word generator 3 in a manner which is well-known per se. The control word is encrypted into an Entitlement Control Message (ECM) by an ECM generator 4 together with access criteria which identify the service and the conditions required to access the service. For example, the access criteria may specify regional limitations on the broadcast. A further type of message, referred to as an Entitlement Management Message (EMM), which carries details of the subscriber and his subscription is generated by an EMM generator 5. While an ECM message is associated with a scrambled programme or set of programmes and carries the information required to decrypt those programmes, an EMM message is a message dedicated to an individual user or group of users and carries the information necessary to determine whether those users have the necessary subscriptions in place to be able to view the programmes.

The scrambled encoded broadcast stream together with the ECM and EMM messages is multiplexed in a multiplexer 6 with other broadcast streams representing other programmes, together making up a subscription package from a particular service provider. The package is sent to a transmitter 7 from which it is transmitted, via a communications channel 8, for example a satellite or cable channel, using an appropriate modulation scheme. The scrambled encoded broadcast stream is received at a subscriber's receiver 9, for example a satellite dish, and passed to the subscriber's set-top box 10.

On receipt at a set-top box (STB) 10, the received data is demultiplexed in a demultiplexer 11, to extract the required programme and its associated ECM and EMM messages. The extracted ECM and EMM messages are sent to a plug-in smart card 12. The smart card 12 uses the ECM and EMM messages to determine whether the subscriber has the right to view the broadcast and if so, to decrypt the control word CW, which is input to a descrambler 13 together with the scrambled broadcast stream to recover the original MPEG-II encoded broadcast stream. The encoded stream is passed to an MPEG-II decoder 14 which produces an output signal comprising audio, video and data components for display on the subscriber's television 15.

The control word comprises alternating odd and even control words which are alternated at, for example, two second intervals. Each control word is changed at predetermined intervals, for example, every twenty seconds. A continuous stream of ECM messages is therefore required to descramble the scrambled signal. The EMM message can be updated less frequently.

The conventional form of ECM and EMM messages is defined in the international standard ISO IEC 13818-1, the entire contents of which are incorporated herein by reference.

Figure 2:
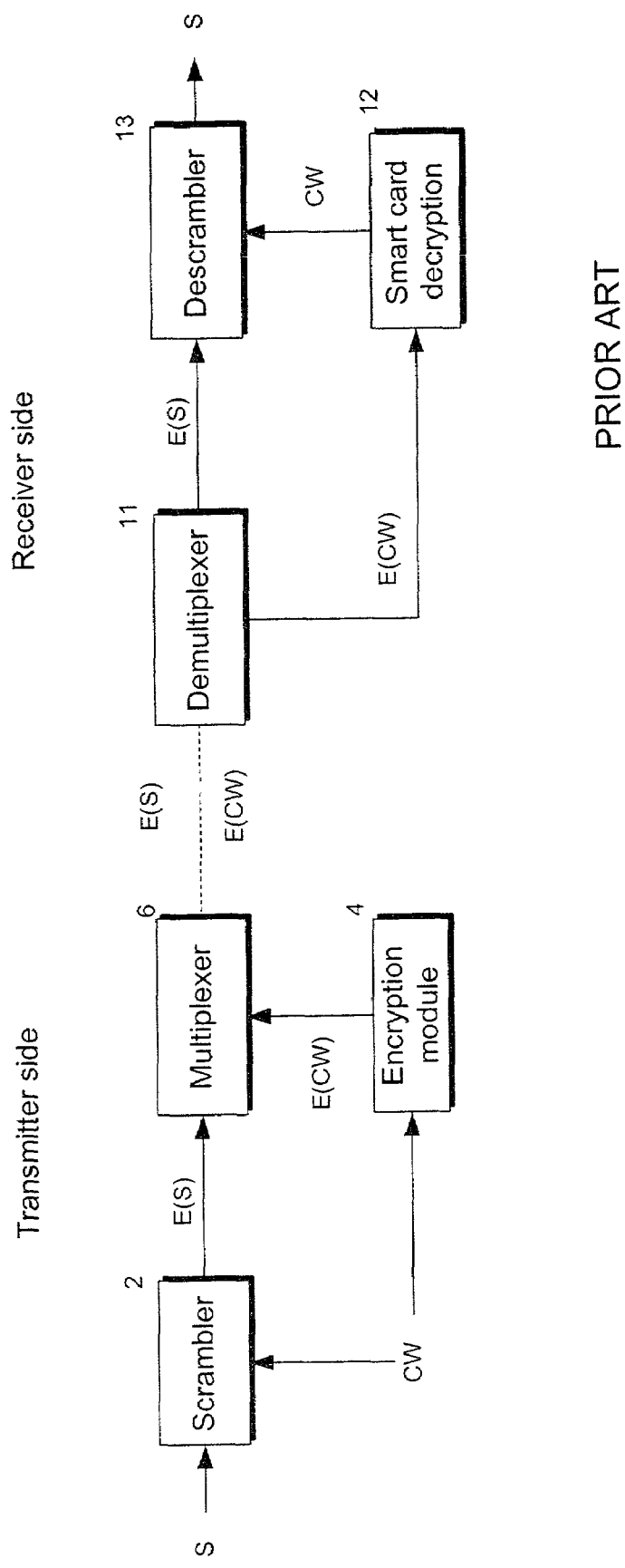
FIG. 2 is a schematic diagram illustrating the flow of encrypted information and control information in the system of FIG. 1.

FIG. 2 illustrates the flow of signal data and the control word (CW) within the system of FIG. 1. On the transmitter side, the control word CW is used to encrypt the unencrypted broadcast signal S in the scrambler 2 to generate an encrypted signal E(S). This is passed to the multiplexer 6 together with the encrypted control word E(CW) generated by the encryption module 4. On the receiver side, the encrypted signal E(S) and encrypted control word E(CW) from the multiplexer 6 are fed to the demultiplexer 11. This outputs the encrypted signal E(S) to the descrambler 13 and the encrypted control word E(CW) to the smart card decryption module 12. The smart card 12 contains the cryptographic key necessary to decrypt the encrypted control word E(CW) to reproduce the original control word CW. This is used in the descrambler 13 to descramble the encrypted signal E(S) to reproduce the original signal S.

Figure 3:
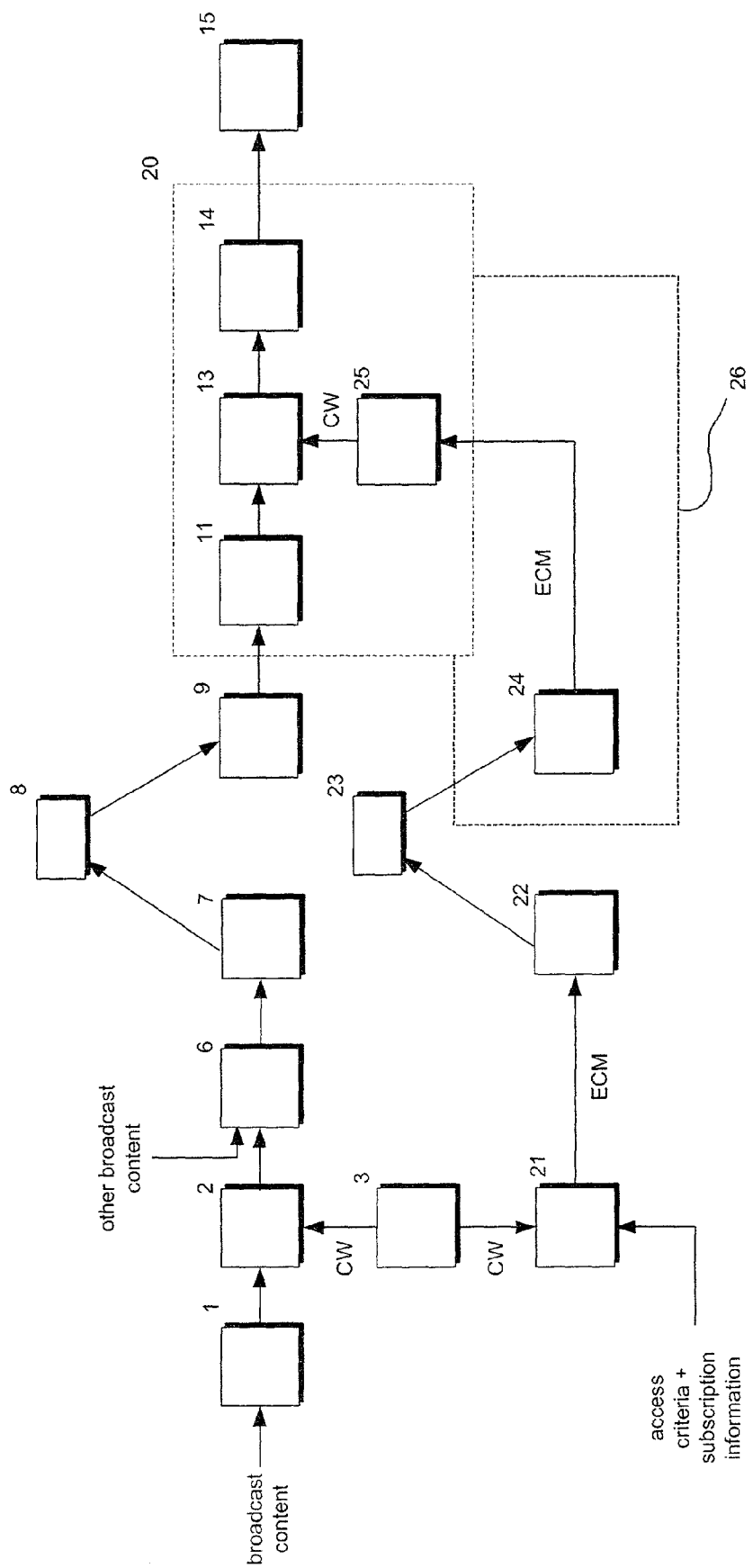
FIG. 3 is a schematic diagram illustrating a conditional access system according to the invention.
Figure 4:
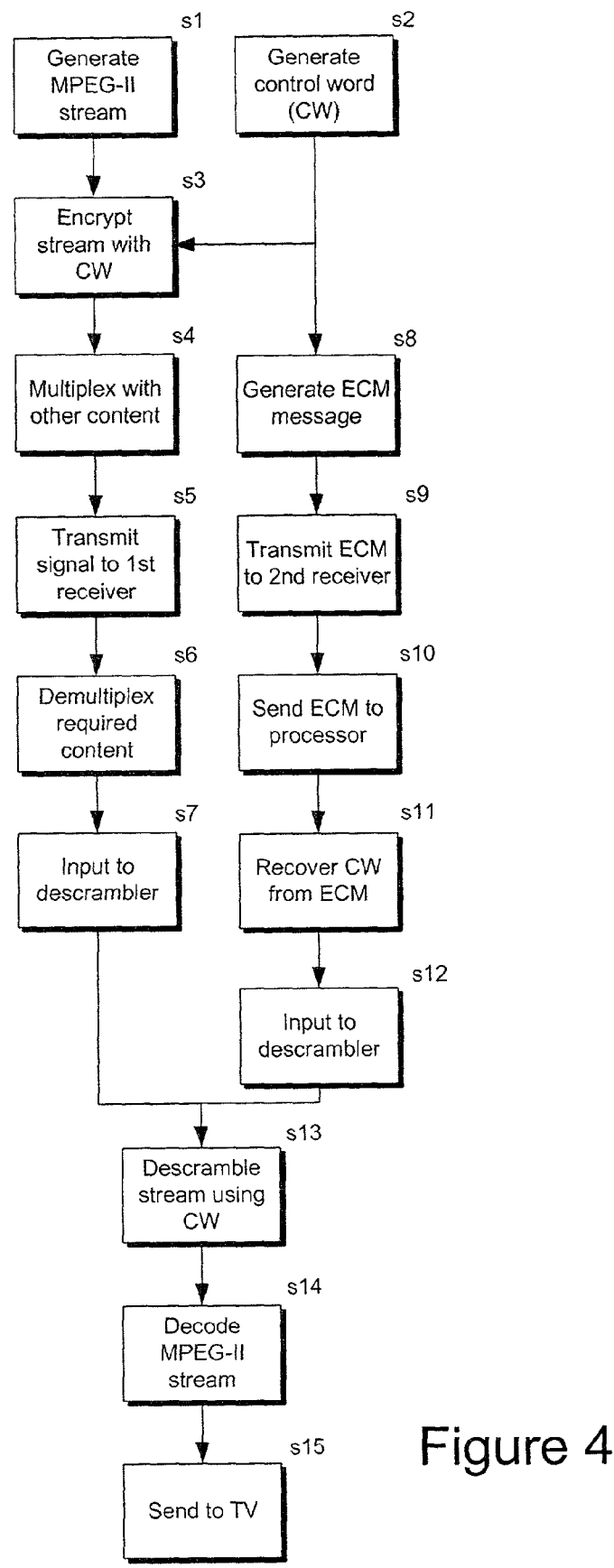
FIG. 4 is a flow diagram illustrating the operation of the system of FIG. 3.

FIG. 3 shows an embodiment of the invention which is a modification of the system of FIG. 1. In the conditional access system shown in FIG. 3, rather than sending the ECM messages along with the broadcast channel, the ECM messages are sent on a separate channel. Referring to FIGS. 3 and 4, broadcast content is encoded using an MPEG-II encoder 1 (step s1). A control word is generated by a control word generator 3 (step s2) and the encoded broadcast stream is encrypted or scrambled in a scrambler 2 under the control of the control word CW (step s3). The scrambled programme is multiplexed with a plurality of other programmes (step s4) in a multiplexer 6 and transmitted from a transmitter 7 via communications channel 8 to a receiver 9, together comprising, for example, a satellite communications link (step s5). A demultiplexer 11 extracts the required programme stream from the received signal (step s6), which is then sent to a set-top box 20, also referred to herein as a decoder (step s7). The decoder includes a descrambler 13 for descrambling the scrambled broadcast signal under the control of a control word.

An ECM server 21 is used to generate an ECM message which incorporates the control word CW without encryption (step s8), together with the access criteria described with reference to FIG. 1. The subscription information which would conventionally be carried by an EMM message is incorporated into the ECM message. The ECM message is not multiplexed into the broadcast stream, but is sent to a second transmitter 22, from where it is transmitted by a second communications channel 23 to a second receiver 24 (step s9). The ECM message is passed from the second receiver 24 to a processor 25 within the set-top box 20 (step s10). The processor 25 checks that the subscription information in the ECM is valid and extracts the control word CW from the ECM message (step s11). This is input to the descrambler 13 (step s12). The descrambler 13 descrambles the broadcast stream using the control word (step s13). The descrambled encoded stream is passed to an MPEG-II decoder 14 which produces an output signal comprising audio, video and data components (step s14) which is sent for display on the subscriber's television 15 (step s15).

The communications channel 23 in this embodiment comprises a virtual private network (VPN). In other embodiments of the invention, the communications channel 23 comprises a cellular telephone network such as a GSM, UMTS or GPRS network, a conventional PSTN point-to-point telephone connection, a DSL connection, a secure HTTPS socket connection over the Internet, another IP based network, for example using streaming media, or a network based on a different protocol or any other form of communications link over satellite, cable, by terrestrial transmission or otherwise. In preferred embodiments of the invention, a secure link is used to enhance the security of the transmitted control word.

In the event that the receiver 24 comprises a mobile telephone, this can be linked to the set-top box by any suitable means, including for example, a cable or infra-red connection.

While FIG. 3 shows the second receiver 24 as separate from the set-top box 20, in an alternative embodiment, the second receiver 24 is located within the set-top box 20, as shown by the dotted line marked 26 in FIG. 3. For example, the second receiver 24 provides a network connection which permits the set-top box 20 to be plugged into an appropriate network to provide the ECM message stream.

Figure 5:
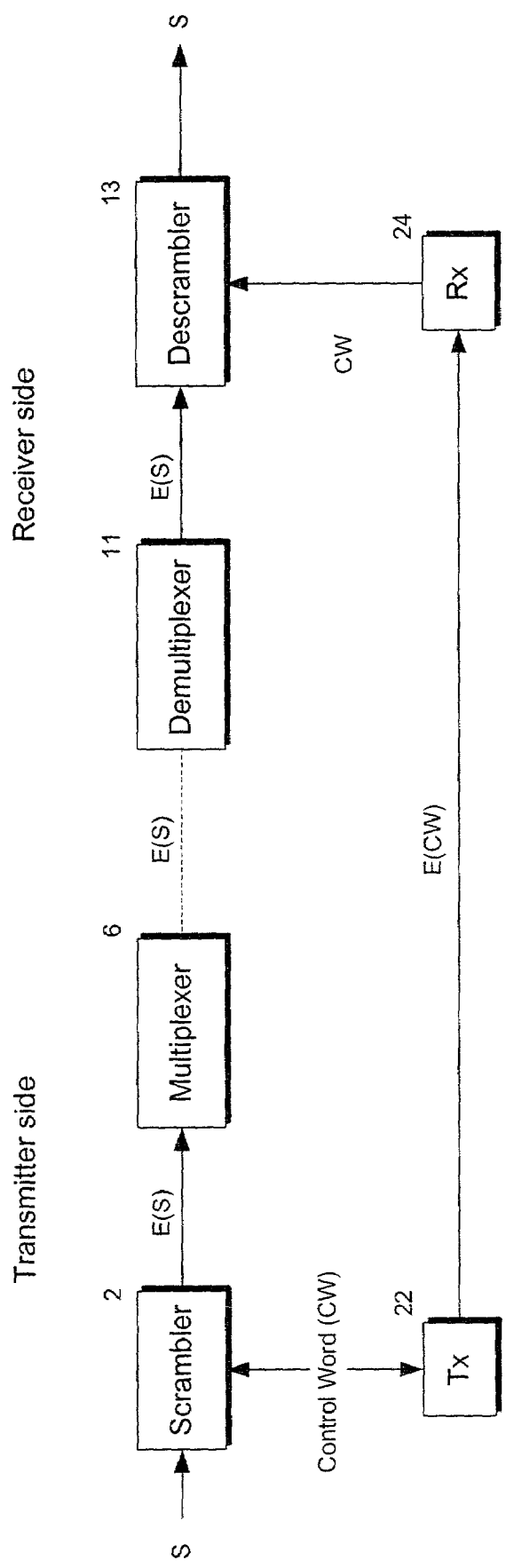
FIG. 5 is a schematic diagram illustrating the flow of encrypted information and control information in the system of FIG. 3.

FIG. 5 illustrates the flow of signal data and the control word (CW) within the system of FIG. 3. On the transmitter side, the control word CW is used to encrypt the unencrypted broadcast signal S in the scrambler 2 to generate an encrypted signal E(S). The encrypted signal E(S) is sent to the descrambler 13 on the receiver side, via the multiplexer 6 and demultiplexer 11. The control word CW is sent unencrypted to the transmitter 22 where it is encrypted for transmission over a virtual private network 23. The control word CW is decrypted at the receiver 24 and sent to the descrambler 13 in unencrypted form, where it is used to descramble the encrypted signal E(S) to reproduce the original signal S. A smart card containing decryption keys is therefore not required in the set-top box.

By transmitting the ECM on a separate channel from the broadcast stream, the ECM becomes individualised, i.e. it applies to an individual subscriber or group of subscribers, so that a range of new services become available. A conditional access system according to the invention enables a third party to assemble a package of channels from different service providers and distribute the package in a secure way by encrypting the package with its own control words and transmitting the control words to each subscriber via a point-to-point connection.

The above example has been described with the control word being inserted into the ECM message in unencrypted form and the ECM message being encrypted for transmission over the secure channel. In an alternative embodiment, a further level of encryption is applied by encrypting the control word CW into the ECM message, to increase the security of the conditional access system, in which case a smart card is again required in the set-top box. The smart card can be a software smart card or a virtual smart card. Alternatively, a second ECM smart card is provided as a travel smart card, so that if the first smart card for the set-top box is not in use, the second ECM smart card is used to allow point-to-point transmission of ECM messages, for example, in a roaming scenario as described below.

A conditional access system can be provided in which the possibility of roaming exists in an analogous way to roaming in a GSM network. A subscriber wishing to view a program using a set-top box arrangement in a different region from his home region requests authorisation from that region's service provider, using a travel smart card as described above. The service provider checks that a subscription arrangement exists between the subscriber and his home network and, if so, transmits the control word stream required to decrypt the required program to the subscriber over a point-to-point connection.

Once a subscriber has requested point-to-point transmission of ECMs to his current location, the EMM information can be removed from the home region-based service by a subscriber authorisation system used by the service provider. This temporarily denies access to services at the subscriber's home location.

The subscriber's home region-based decoder can be a conventional decoder receiving ECMs transmitted with the broadcast stream. The decoder used at the roaming location is a decoder according to the invention, equipped to receive an ECM stream point-to-point. Two sets of ECMs are therefore being transmitted, the first multiplexed with the broadcast stream enabling viewing by the conventional decoder and the second ECM stream being transmitted over a separate channel from the broadcast stream to enable a decoder according to the invention to view the programme.

To reduce the required number and calculation of ECM messages for individual subscribers, the personalised ECM messages can be sent to groups of subscribers, the size of the group depending on the level of security required. A further way of reducing calculation needs is to send ECM messages for one channel only, rather than for every channel, since only the control words for the channel actually being watched need to be transferred.

The embodiments described above envisage the contents of the EMM messages being subsumed into the ECM messages. Of course, if it is desired to maintain the separation of the information, for example because EMM messages need to be sent much less frequently than ECM messages, then EMM messages can continue to be sent, either incorporated in the broadcast stream, or via a separate channel, as explained for example in WO 98/43426, which is incorporated herein by reference. For example, to block use of the home decoder in the event that the roaming facility is used, EMM messages sent to the first decoder can indicate that subscription rights are not available while the roaming facility is in use. If the information that would conventionally be carried by an EMM message is not needed in a particular scenario, EMM messages need not be sent at all.

The invention claimed is:

1. A method comprising:
   receiving, at a second service provider, a user request for transmission of control messages to a decoder over a roaming network in a second region, wherein the control messages are configured to descramble a program included in a scrambled broadcast stream broadcast by the second service provider over the roaming network;
   in response to the request, checking whether a subscription arrangement exists between a user associated with the user request and a first service provider configured to broadcast over a home network in a first region different from the second region, wherein the subscription arrangement enables roaming; and
   if the subscription arrangement exists, transmitting the control messages from the second service provider to the second decoder.

2. A method according to claim 1, wherein said control messages are alone sufficient to descramble said second broadcast stream.

3. A method according to claim 1, wherein the first decoder is arranged to receive the control messages with the first broadcast stream and the second decoder is arranged to receive the control messages separate from the second broadcast stream.

4. A method according to claim 1, wherein the first decoder is associated with a first smart card, and a user uses a second smart card to request access to the second broadcast stream at the second decoder.

5. A method comprising:
transmitting a second scrambled broadcast stream from a second service provider in a second region to a second decoder and transmitting a first scrambled broadcast stream to a first decoder from a first service provider in a first region different from the second region, wherein said first and second decoders are configured to receive control messages including information for descrambling the first and second scrambled broadcast streams;
receiving, at the second service provider, a user request for accessing the second scrambled broadcast stream at the second decoder;
checking whether a user associated with the user request is authorized to access the second scrambled broadcast stream by checking that a subscription arrangement exists between the user and the first service provider;
in the event the user is authorized to access the second broadcast stream, transmitting the control messages from the second service provider to said second decoder; and
denying a service to the first decoder while the control messages are being sent to the second decoder.

6. A method according to claim 5, wherein the control messages comprise entitlement control messages, and the first decoder further receives entitlement management messages for providing subscription information, wherein denying a service to the first decoder comprises removing the entitlement management messages.

7. A method according to claim 5, wherein the control messages comprise entitlement control messages, and the first decoder further receives entitlement management messages for providing subscription information, wherein denying a service to the first decoder comprises sending entitlement management messages that indicate that subscription rights are not available in the first region while the user is roaming to the second region.

8. An apparatus comprising:
a subscription authorization module configured to enable a second service provider to check if a user is authorized to access a second scrambled broadcast stream at a second decoder,
wherein the check is performed in response to a request, from the user, for transmission of control messages to the second decoder, wherein the control messages are configured to descramble a program included in the second scrambled broadcast stream,
wherein the second scrambled broadcast stream is configured for transmission from the second service provider to the second decoder over a roaming network in a second region, wherein the second service provider is different from a first service provider configured to transmit a first scrambled broadcast stream carrying the program to a first decoder over a home network in a first region different from the second region; and
a transmitter for transmitting the control messages to the second decoder if access is authorized,
wherein the first and second decoder are operable to receive the control messages including information for descrambling the first and second scrambled broadcast streams, and
wherein the subscription authorization module is configured to check that a subscription arrangement enabling roaming exists between the user and the first service provider to determine whether the user is authorized to access the second scrambled broadcast stream at the second decoder.

9. An apparatus according to claim 8, wherein the first decoder is associated with a first smart card and the subscription authorization module is arranged to receive a request from a second smart card at the second decoder.

10. An apparatus according to claim 9, wherein the first smart card is a software smart card.

11. An apparatus according to claim 9, wherein the first smart card is a virtual smart card.

12. An apparatus according to claim 9, wherein the second smart card is a software smart card.

13. An apparatus according to claim 9, wherein the second smart card is a virtual smart card.

14. An apparatus comprising:
a subscription authorization module configured to enable a second service provider to check if a user is authorized to access a second scrambled broadcast stream at a second decoder,
wherein the check is performed in response to a request, from the user, for transmission of control messages to the second decoder, wherein the control messages are configured to descramble a program included in the second scrambled broadcast stream,
wherein the second scrambled broadcast stream is configured for transmission from the second service provider to the second decoder over a roaming network in a second region,
wherein the second service provider is different from a first service provider configured to transmit a first scrambled broadcast stream carrying the program to a first decoder over a home network in a first region different from the second region;
a transmitter for transmitting the control messages to the second decoder if access is authorized; and
an access prevention module configured to prevent the first decoder from accessing the first scrambled broadcast stream when the control messages are transmitted to the second broadcast stream,
wherein the subscription authorization module is operable to check that a subscription arrangement enabling roaming exists between the user and the first service provider to determine whether the user is authorized to access the second scrambled broadcast stream at the second decoder.

15. An apparatus according to claim 14, wherein the access prevention module comprises means for removing subscription rights of the user through entitlement control messages sent to the first decoder.

16. An apparatus according to claim 14, wherein the access prevention module comprises means for removing the entitlement control messages sent to the first decoder.

* * * * *

UNITED STATES PATENT AND TRADEMARK OFFICE
CERTIFICATE OF CORRECTION

PATENT NO. : 7,383,561 B2  Page 1 of 1
APPLICATION NO. : 09/893523
DATED : June 3, 2008
INVENTOR(S) : Rickard Nelger et al.

It is certified that error appears in the above-identified patent and that said Letters Patent is hereby corrected as shown below:

On the cover page Abstract section (57), line 1:
  Please replace "access system in which" with -- access system, in which --.

On the cover page Abstract section (57), line 2:
  Please replace "containing the encryption keys" with -- containing encryption keys --.

In column 7, claim 8, line 57:
  Please replace "wherein the first and second decoder" with -- wherein the first and second decoders --.

Signed and Sealed this

Third Day of November, 2009

David J. Kappos
*Director of the United States Patent and Trademark Office*